US012641302B2

(12) United States Patent
Wang et al.

(10) Patent No.: US 12,641,302 B2
(45) Date of Patent: *May 26, 2026

(54) METHOD AND SYSTEM FOR CONTROLLING INTERACTIVE LIVE STREAMING CO-HOSTING, DEVICE, AND MEDIUM

(71) Applicant: BEIJING BYTEDANCE NETWORK TECHNOLOGY CO., LTD., Beijing (CN)

(72) Inventors: Wanhong Wang, Beijing (CN); Yalou Wang, Beijing (CN); Jiahuan Huang, Beijing (CN); Yong Zhu, Beijing (CN); Yaxin Li, Beijing (CN); Xin Che, Beijing (CN); Jiacheng Liu, Beijing (CN); Zihao Zhang, Beijing (CN); Yuanyuan Wang, Beijing (CN); Zheqi Qu, Beijing (CN); Weihao Xu, Beijing (CN); Jianping Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 114 days.

This patent is subject to a terminal disclaimer.

(21) Appl. No.: 18/797,215

(22) Filed: Aug. 7, 2024

(65) Prior Publication Data

US 2025/0097486 A1 Mar. 20, 2025

Related U.S. Application Data

(63) Continuation of application No. 18/148,185, filed on Dec. 29, 2022, now Pat. No. 12,088,857, which is a
(Continued)

(30) Foreign Application Priority Data

Aug. 14, 2020 (CN) .......................... 202010821116.7

(51) Int. Cl.
| | |
|---|---|
| *H04N 21/2187* | (2011.01) |
| *A63F 13/86* | (2014.01) |
| *H04N 21/431* | (2011.01) |

(52) U.S. Cl.
CPC ......... *H04N 21/2187* (2013.01); *A63F 13/86* (2014.09); *H04N 21/4312* (2013.01)

(58) Field of Classification Search
CPC .......... H04N 21/2187; H04N 21/4312; H04N 21/43072; H04N 21/4316; H04N 21/4781;
(Continued)

(56) References Cited

U.S. PATENT DOCUMENTS

| | | | |
|---|---|---|---|
| 10,469,880 B1 | 11/2019 | Kravis et al. | |
| 2013/0038632 A1 | 2/2013 | Dillavou et al. | |

(Continued)

FOREIGN PATENT DOCUMENTS

| | | |
|---|---|---|
| CN | 107105311 A | 8/2017 |
| CN | 107566911 A | 1/2018 |

(Continued)

OTHER PUBLICATIONS

European Search Report received for EP Patent Application No. 21855545.6, mailed on Jan. 17, 2024, 4 pages.
(Continued)

*Primary Examiner* — Adil Ocak

(57) ABSTRACT

Provided are a method and system for controlling interactive live streaming co-hosting, a device, and a medium. The method includes acquiring a first interactive image and receiving a mirror interactive image of a second terminal by a first terminal, where the first terminal and the second terminal are in a live streaming co-hosting state, and the mirror interactive image of the second terminal is obtained by performing mirror processing on a second interactive
(Continued)

image of the second terminal; and combining the first interactive image and the mirror interactive image by the first terminal to obtain a target interactive image.

13 Claims, 7 Drawing Sheets

Related U.S. Application Data continuation of application No. PCT/CN2021/111925, filed on Aug. 11, 2021.

(58) Field of Classification Search
CPC .......... H04N 21/4788; H04N 21/8547; H04N 21/44016; A63F 13/86; A63F 13/352; A63F 13/355; A63F 13/847
USPC ....................................................... 709/231
See application file for complete search history.

(56) References Cited

U.S. PATENT DOCUMENTS

| | | | |
|---|---|---|---|
| 2016/0065880 A1 | 3/2016 | Pearson et al. | |
| 2018/0133603 A1 | 5/2018 | Ninoles et al. | |
| 2018/0139252 A1 | 5/2018 | Wang et al. | |
| 2020/0248988 A1 | 8/2020 | Perez | |
| 2021/0397402 A1 | 12/2021 | Ashkenazi et al. | |
| 2023/0021380 A1 | 1/2023 | Ono et al. | |

FOREIGN PATENT DOCUMENTS

| | | | |
|---|---|---|---|
| CN | 107680157 | A | 2/2018 |
| CN | 107682729 | A | 2/2018 |
| CN | 108390816 | A | 8/2018 |
| CN | 108900854 | A | 11/2018 |
| CN | 108965769 | A | 12/2018 |
| CN | 109068181 | A | 12/2018 |
| CN | 110755845 | A | 2/2020 |
| CN | 111314720 | A | 6/2020 |
| CN | 111385592 | A | 7/2020 |
| CN | 111970524 | A | 11/2020 |
| JP | 2016-133886 | A | 7/2016 |
| WO | 2017/219347 | A1 | 12/2017 |
| WO | 2019/232094 | | 12/2019 |

OTHER PUBLICATIONS

First Office Action issued Jul. 13, 2021 in Chinese Application No. 202010821116.7, with English translation (24 pages).

International Search Report mailed Nov. 11, 2021 in International Application No. PCT/CN2021/111925, with English translation (5 pages).

Matsuzawa., "WebRTC and coraldistribution CA Base Camp", Cyber Agent, vol. 1, Mar. 5, 2019, pp. 1-16.

Office action received from Japanese patent application No. 2023-502873 mailed on Mar. 5, 2024, 9 pages (4 pages English Translation and 5 pages Original Copy).

Provisional 63043081 drawings—Ashkenazi et al., Multi-Stream Remote Interactive Platform, Jun. 23, 2020.

Provisional 63043081 specification—Ashkenazi et al., Multi-Stream Remote Interactive Platform, Jun. 23, 2020.

Second Office Action issued Oct. 8, 2021 in Chinese Application No. 202010821116.7, with English translation (23 pages).

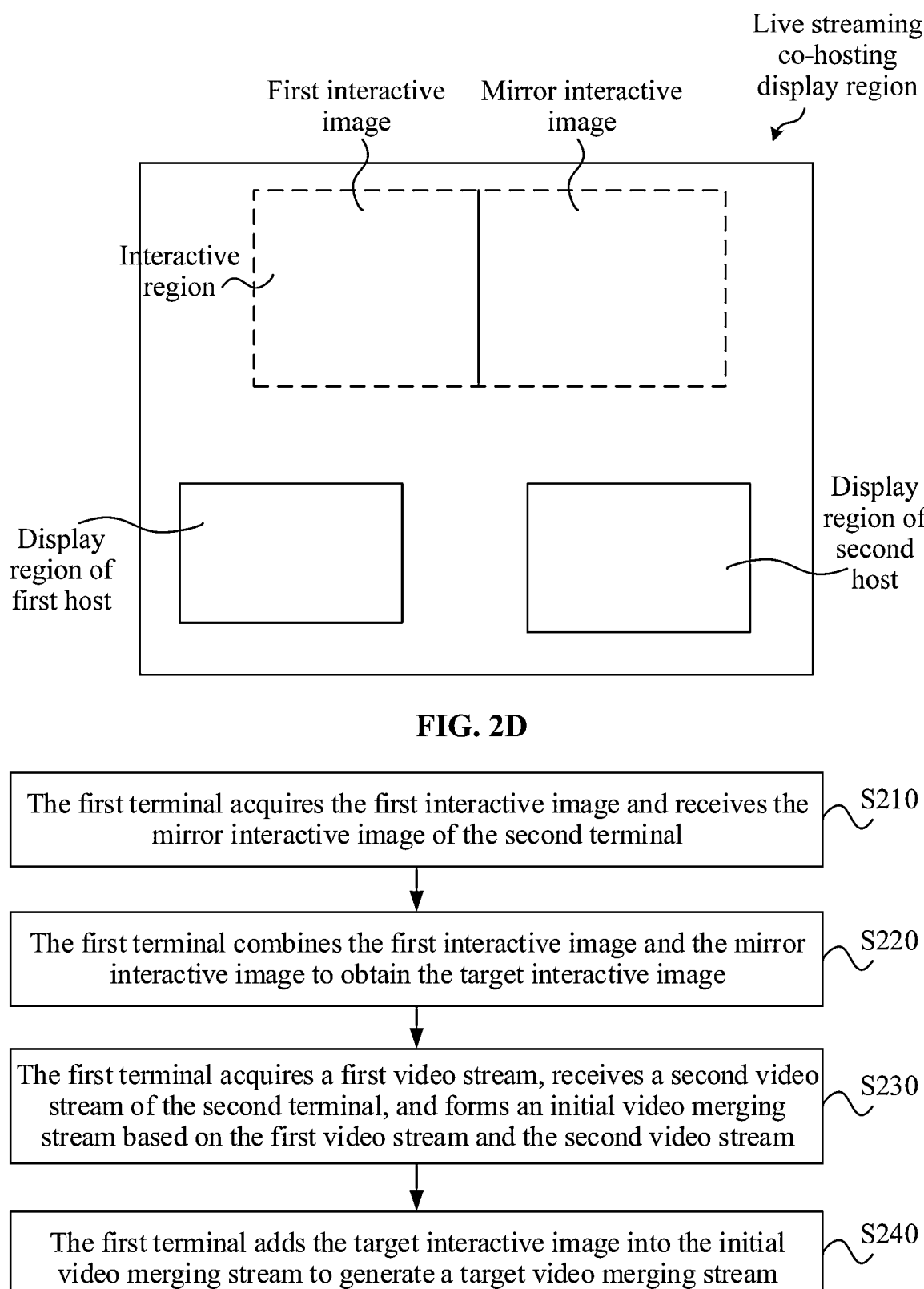

FIG. 2D

| S210 | The first terminal acquires the first interactive image and receives the mirror interactive image of the second terminal |
| S220 | The first terminal combines the first interactive image and the mirror interactive image to obtain the target interactive image |
| S230 | The first terminal acquires a first video stream, receives a second video stream of the second terminal, and forms an initial video merging stream based on the first video stream and the second video stream |
| S240 | The first terminal adds the target interactive image into the initial video merging stream to generate a target video merging stream |

FIG. 3

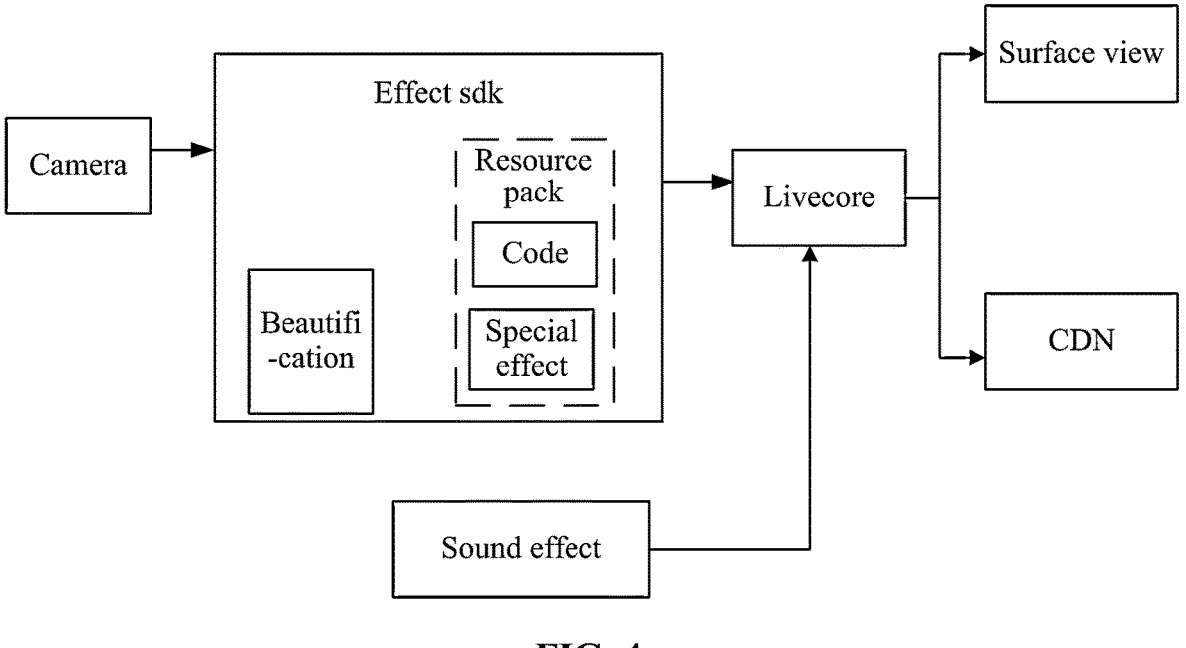
FIG. 4
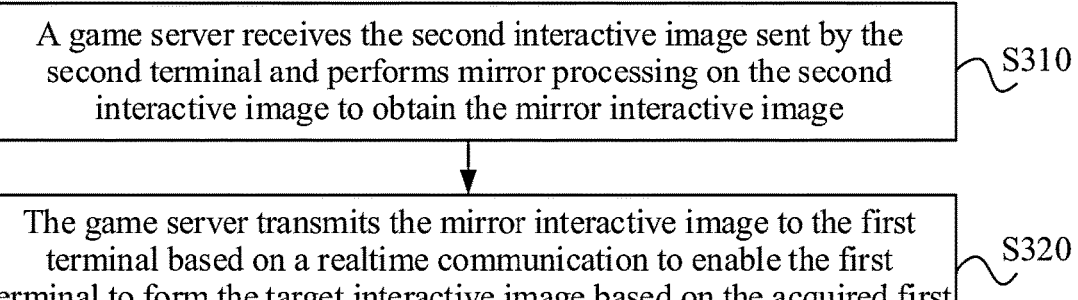
FIG. 5
410                            420
| Interactive image acquisition module | Target interactive image determination module |
|---|---|
FIG. 6

METHOD AND SYSTEM FOR CONTROLLING INTERACTIVE LIVE STREAMING CO-HOSTING, DEVICE, AND MEDIUM

CROSS-REFERENCE TO RELATED APPLICATIONS

This application is a continuation of U.S. patent application Ser. No. 18/148,185, filed on Dec. 29, 2022, which is a continuation of International Patent Application No. PCT/CN2021/111925, filed on Aug. 11, 2021, which is based on and claims priority to Chinese Patent Application No. 202010821116.7, filed with the China National Intellectual Property Administration (CNIPA) on Aug. 14, 2020, the disclosures of which are incorporated herein by reference in their entireties.

TECHNICAL FIELD

The present disclosure relates to the field of computer data processing technology, for example, a method and system for controlling interactive live streaming co-hosting, a device, and a medium.

BACKGROUND

Network live streaming is widely accepted and applied, and the application of live streaming co-hosting adds more interest to the network live streaming.

During live streaming co-hosting, to ensure that the host in a live streaming session is on the same side from the audience perspective, the video streams of two host terminals may be directly exchanged and displayed on an audience terminal. However, for interactive live streaming co-hosting, the preceding method for directly exchanging the positions of the video streams may lead to image confusion. As a result, the interactive live streaming co-hosting cannot be implemented.

SUMMARY

The present disclosure provides a method and system for controlling interactive live streaming co-hosting, a device, and a medium to form a display image satisfying an interactive live streaming co-hosting scenario, thereby avoiding image confusion.

The present disclosure provides a method for controlling interactive live streaming co-hosting. The method includes the steps below.

A first terminal acquires a first interactive image and receives a mirror interactive image of a second terminal. The first terminal and the second terminal are in a live streaming co-hosting state. A second interactive image of the second terminal is mirrored to obtain the mirror interactive image of the second terminal.

The first terminal combines the first interactive image and the mirror interactive image to obtain a target interactive image.

The present disclosure also provides a method for controlling interactive live streaming co-hosting. The method includes the steps below.

A game server receives a second interactive image sent by a second terminal and mirrors the second interactive image to obtain a mirror interactive image.

The game server transmits the mirror interactive image to a first terminal based on a realtime communication to enable the first terminal to form a target interactive image based on an acquired first interactive image and the mirror interactive image.

The present disclosure also provides an apparatus for controlling interactive live streaming co-hosting. The apparatus is integrated in a first terminal and includes an interactive image acquisition module and a target interactive image determination module.

The interactive image acquisition module is configured to acquire a first interactive image and receive a mirror interactive image of a second terminal. The first terminal and the second terminal are in the live streaming co-hosting state. A second interactive image of the second terminal is mirrored to obtain the mirror interactive image of the second terminal.

The target interactive image determination module is configured to combine the first interactive image and the mirror interactive image to obtain a target interactive image.

The present disclosure also provides an apparatus for controlling interactive live streaming co-hosting. The apparatus is integrated in a server and includes a mirror interactive image determination module and a mirror interactive image transmission module.

The mirror interactive image determination module is configured to receive a second interactive image sent by a second terminal and mirror the second interactive image to obtain the mirror interactive image.

The mirror interactive image transmission module is configured to transmit the mirror interactive image to a first terminal based on a realtime communication to enable the first terminal to form a target interactive image based on an acquired first interactive image and the mirror interactive image.

The present disclosure also provides a system for controlling interactive live streaming co-hosting. The system includes a first terminal, a second terminal, and a game server. The first terminal and the second terminal are in the live streaming co-hosting state.

The first terminal is configured to acquire a first interactive image and send the first interactive image to the game server.

The second terminal is configured to acquire a second interactive image and send the second interactive image to the game server.

The game server is configured to perform mirror processing on the first interactive image and the second interactive image respectively to obtain a first mirror interactive image and a second mirror interactive image, transmit the first mirror interactive image to the second terminal, and transmit the second mirror interactive image to the first terminal.

The first terminal is also configured to generate a first target interactive image based on the first interactive image and the second mirror interactive image.

The second terminal is also configured to generate a second target interactive image based on the second interactive image and the first mirror interactive image.

The present disclosure also provides an electronic device. The device includes one or more processors and a storage apparatus.

The storage apparatus is configured to store one or more programs.

When executing the one or more programs, the one or more processors perform the preceding method for controlling interactive live streaming co-hosting.

The present disclosure also provides a storage medium including computer-executable instructions. When executing the computer-executable instructions, a computer processor performs the preceding method for controlling inter-
active live streaming co-hosting.

BRIEF DESCRIPTION OF DRAWINGS

FIG. 2D is a diagram of another display region of live
streaming co-hosting according to embodiment one of the
present disclosure;

FIG. 3 is a flowchart of a method for controlling inter-
active live streaming co-hosting according to embodiment
two of the present disclosure;

FIG. 4 is a diagram of a live streaming flow according to
embodiment two of the present disclosure;

FIG. 5 is a flowchart of a method for controlling inter-
active live streaming co-hosting according to embodiment
three of the present disclosure;

FIG. 6 is a diagram illustrating the structure of an appa-
ratus for controlling interactive live streaming co-hosting
according to embodiment five of the present disclosure;

DETAILED DESCRIPTION

Embodiments of the present disclosure are described
below with reference to the drawings. The drawings illus-
trate some embodiments of the present disclosure, but it
should be understood that the present disclosure may be
implemented in various manners and should not be limited
to the embodiments set forth herein.

The various steps recited in method embodiments of the
present disclosure may be performed in a different order
and/or in parallel. In addition, the method embodiments may
include additional steps and/or omit execution of illustrated
steps. The scope of the present disclosure is not limited in
this respect.

As used herein, the term "include" and variations thereof
are intended to be inclusive, that is, "including, but not
limited to". The term "based on" is "at least partially based
on". The term "one embodiment" means "at least one
embodiment"; the term "another embodiment" means "at
least one another embodiment"; and the term "some embodi-
ments" means "at least some embodiments". Related defi-
nitions of other terms are given in the description hereinaf-
ter.

Concepts such as "first" and "second" in the present
disclosure are merely intended to distinguish one from
another apparatus, module or unit and are not intended to
limit the order or interrelationship of the functions per-
formed by the apparatus, module or unit.

"One" and "a plurality" mentioned in the present disclo-
sure are illustrative, are not intended to limit the present
disclosure, and should be understood as "one or more"
unless expressed in the context.

Embodiment One

Figure 1:
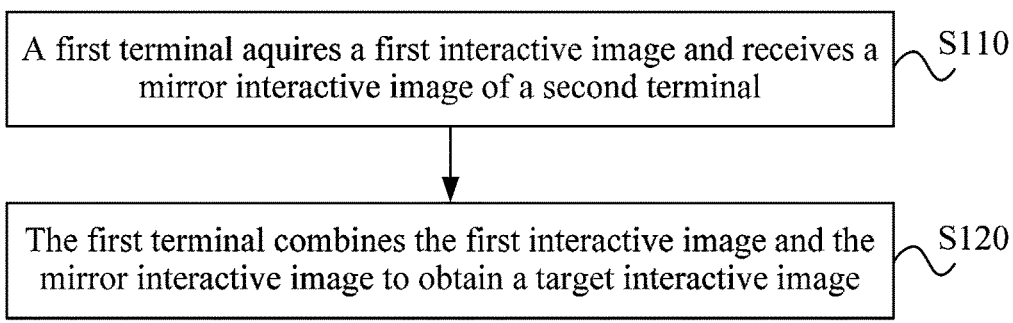
FIG. 1 is a flowchart of a method for controlling inter-
active live streaming co-hosting according to embodiment
one of the present disclosure.

FIG. 1 is a flowchart of a method for controlling inter-
active live streaming co-hosting according to embodiment
one of the present disclosure. This embodiment of the
present disclosure is applied to the case where a live
streaming interactive image is formed in the application
scenario of interactive live streaming co-hosting. This
method may be executed by an apparatus for controlling
interactive live streaming co-hosting. The apparatus may be
implemented in the form of software and/or hardware. The
apparatus may be implemented by an electronic device. The
electronic device may be a mobile terminal or a personal
computer (PC) terminal.

As shown in FIG. 1, the method in this embodiment
includes the steps below.

In S110, a first terminal acquires a first interactive image
and receives a mirror interactive image of a second terminal.

In S120, the first terminal combines the first interactive
image and the mirror interactive image to obtain a target
interactive image.

The first terminal and the second terminal perform the live
streaming co-hosting. The first terminal and the second
terminal may be mobile terminals such as mobile phones or
tablet computers, or may be electronic devices such as PC
terminals. The first terminal or the second terminal may send
a co-hosting request to a live streaming server, where the
co-hosting request may include identifier information of the
first terminal and the second terminal. The live streaming
server performs co-hosting matching according to the co-
hosting request to implement the live streaming co-hosting
between the first terminal and the second terminal.

Figure 2A:
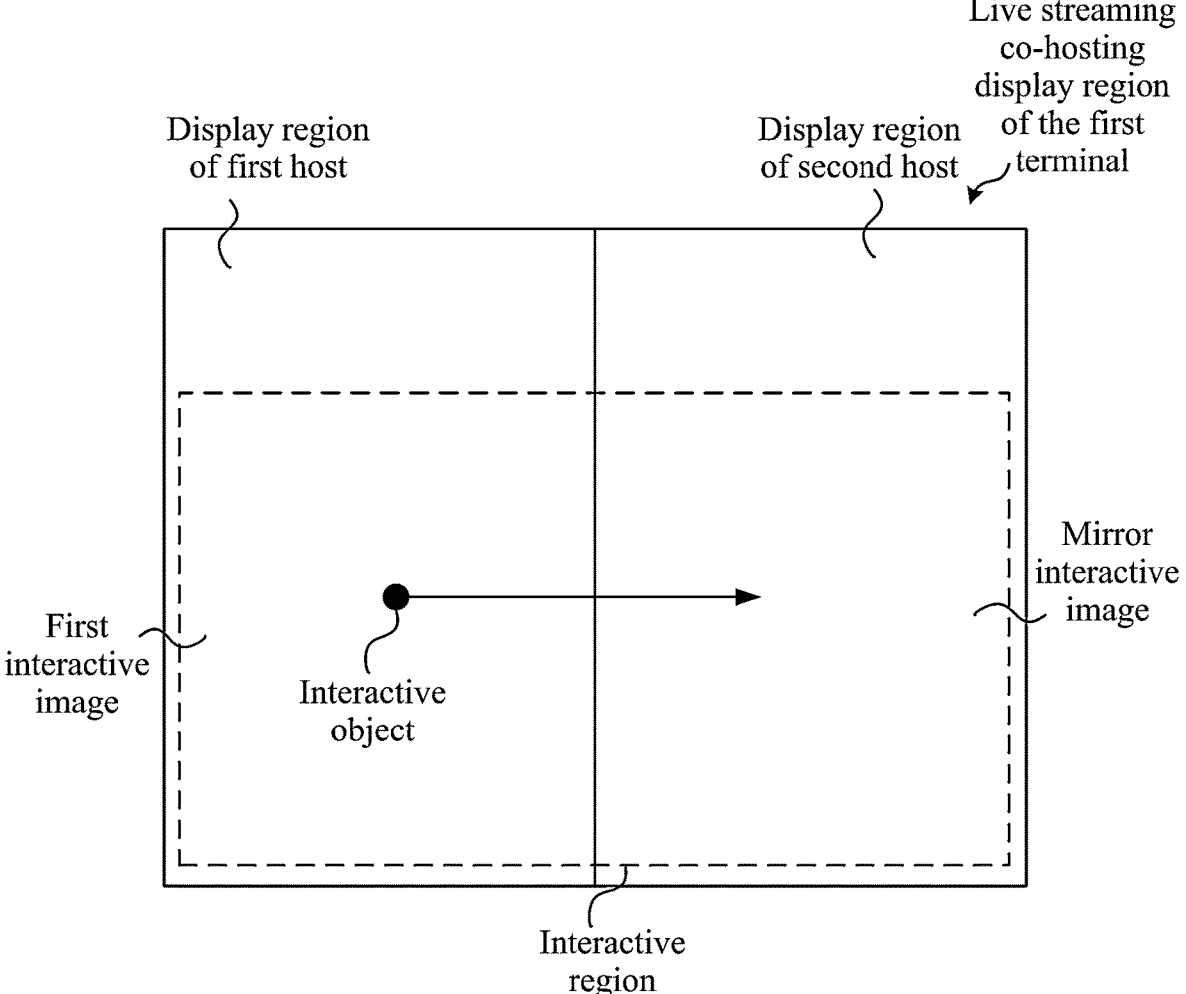
FIG. 2A is a diagram of a display region of live streaming
co-hosting displayed by a first terminal according to
embodiment one of the present disclosure.
Figure 2B:
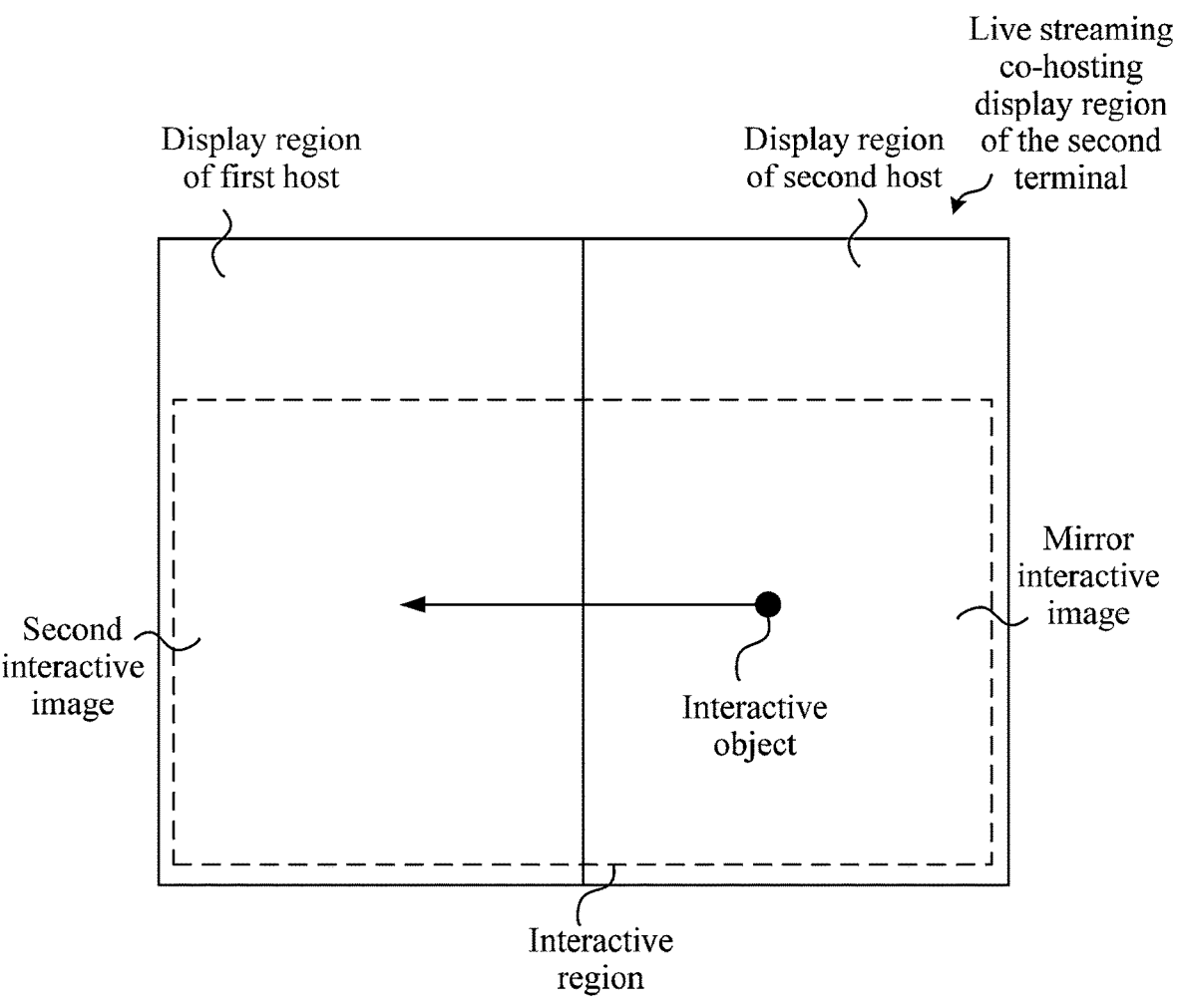
FIG. 2B is a diagram of a display region of live streaming
co-hosting displayed by a second terminal according to
embodiment one of the present disclosure.

In this embodiment, the first terminal and the second
terminal interact in the same interactive region of a display
interface based on an interactive object. Exemplarily, refer-
ring to FIGS. 2A and 2B, FIG. 2A is a diagram of a display
region of live streaming co-hosting displayed by the first
terminal according to embodiment one of the present dis-
closure, and FIG. 2B is a diagram of a display region of live
streaming co-hosting displayed by the second terminal
according to embodiment one of the present disclosure. The
display region may include the display region of a first host,
the display region of a second host, and the interactive
region (dotted region). The interactive region in FIG. 2A or
FIG. 2B is only an example, and the interactive region may
completely overlap, partially overlap, or completely not
overlap with the display region of the first host and the
display region of the second host, which is not limited to this
embodiment. The size of the interactive region is less than
or equal to the size of the overall display region.

The display region of the first host is configured to display
the image or video of the first host acquired by the first
terminal through a camera. The display region of the second
host is configured to display the image or video of the
second host acquired by the second terminal through a
camera. The interactive region is configured to display the
interactive image of the first terminal and the second terminal. At least one interactive object is included in the interactive image, for example, one interactive object is included in FIG. 2A and FIG. 2B and moves along the arrow direction. The interactive object is not limited to the spherical object shown in FIG. 2A and FIG. 2B and may change in real time according to an interactive scenario. The movement manner of the interactive object may also be determined according to the interactive scenario. The movement direction of the interactive object is not limited to the movement directions shown in FIG. 2A and FIG. 2B.

Figure 2C:
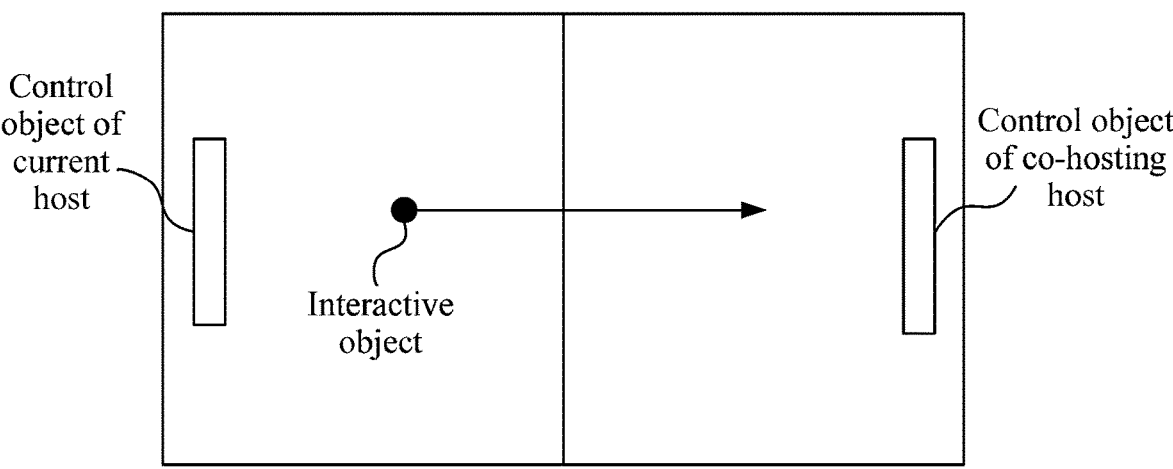
FIG. 2C is a diagram of an interactive scenario according
to embodiment one of the present disclosure.

In an embodiment, the interactive scenario may also include a control object, that is, an object that may be controlled by a control instruction input by a host. In some embodiments, the control object may be different from the interactive object, and the control object of the first terminal and the control object of the second terminal may be different, that is, the first terminal and the second terminal correspond to different control objects separately. For example, referring to FIG. 2C, FIG. 2C is a diagram of an interactive scenario according to embodiment one of the present disclosure. In FIG. 2C, each of the first terminal and the second terminal corresponds to one control object, and the corresponding control object may be controlled to change the position, speed, direction, and shape. An interactive object different from the control object is included in FIG. 2C and moves in the interactive scenario. In some embodiments, the control object may be one or more of the interactive objects, that is, the first terminal or the second terminal may control one or more of the interactive objects so that the one or more interactive objects are controlled to change the position, speed, direction, and shape.

As can be seen from FIGS. 2A and 2B, the position of the display region of the first host in the display region of the first terminal is the same as the position of the display region of the second host in the display region of the second terminal. That is, in any terminal, the display region of the operation user of this terminal should be located at the same position, for example, on the left side of a co-hosting display region. Similarly, the interactive image displayed in the interactive region is also determined by the interactive images acquired by two terminals. The first terminal acquires the first interactive image, the second terminal acquires the second interactive image, the sum of the size of the first interactive image and the size of the second interactive image is the same as the size of the overall interactive image, and the size of the first interactive image may be the same as the size of the second interactive image. Exemplarily, referring to FIGS. 2A and 2B, in the display region of the first terminal, the boundary between the display region of the first host and the display region of the second host is used as a split line, the interactive image located in the display region of the first host is used as the first interactive image. Similarly, in the display region of the second terminal, the boundary between the display region of the first host and the display region of the second host is used as a split line, and the interactive image located in the display region of the second host is used as the second interactive image. Referring to FIG. 2C, in the interactive image displayed by any terminal, the control object corresponding to the current terminal is located on the same side, for example, on the left side of the interactive region. The interactive object moves in the interactive region, that is, the first interactive image and/or the second interactive image includes at least one interactive object. The interactive object moves in the first interactive image and the second interactive image.

To form a complete interactive image, the first terminal acquires the first interactive image, and the second terminal acquires the second interactive image. In an embodiment, the first terminal may acquire the first interactive image in the following manners: The first terminal identifies the control information in a video image of a first user, and controls the control object in the interactive scenario based on the control information; and the first interactive image corresponding to the interactive region of the first terminal is acquired by frame. The first terminal may be configured with a camera, and the camera is configured to acquire a video of the first host. The first terminal identifies control information in multiple frames of video images in the video to control the control object in the interactive scenario. Identification of the control information in the video images may be determined by identifying position information and/or posture information of keypoints of the first host. For example, these keypoints may be, but are not limited to, a finger, an arm, a head, etc. For example, the position information of the control object may be adjusted through the position information of the keypoints, and the direction or shape of the control object may be adjusted through the posture information of the keypoints. In some embodiments, the control information of the control object may be obtained by identifying the face coordinate, where the ordinate of the face coordinate corresponds to longitudinal control information of the control object, and the abscissa of the face coordinate corresponds to the lateral control information of the control object. The face coordinate may be the coordinate of the center point of the face or the coordinate of any specified organ.

According to the control information of the multiple frames of video images in the video of the first host, data of the control object in the interactive region corresponding to the first terminal is determined frame by frame. The first interactive image of a corresponding frame is formed based on the data of the control object and/or the data of the interactive object in the interactive region of the first terminal, the interactive region corresponding to the first terminal may be a part of the interactive region on the side where the display region of the first host is located, and the part of the interactive region may be half of the overall interactive region.

Similarly, the second terminal acquires the second interactive image based on the preceding manner. The second terminal sends the acquired second interactive image to the game server, and the game server performs the mirror processing on the received second interactive image to obtain the mirror interactive image and transmits the mirror interactive image to the first terminal. The game server may directly transmit the mirror interactive image to the first terminal or may transmit the mirror interactive image to the first terminal through a realtime communication (RTC).

The first interactive image and the second interactive image respectively carry the timestamp of an acquisition time, and the mirror interactive image carries the timestamp accordingly. The timestamp of the mirror interactive image is the same as the timestamp of the second interactive image on which the mirror processing is performed.

The first terminal combines the first interactive image and the mirror interactive image that have the same timestamp to obtain the target interactive image of the first terminal. For example, the position of the first interactive image is unchanged, and the mirror interactive image and the first interactive image are aligned and spliced to form the target interactive image. The first interactive image and the mirror interactive image are combined through the timestamp, in this manner, synchronization of interactive images is ensured, and confusion of the interactive images is avoided.

Multiple frames of target interactive images form a target interactive video displayed by the first terminal, the target interactive video is displayed in the live streaming co-hosting display interface of the first terminal, and the target interactive video is pushed to an audience terminal corresponding to the first terminal.

On the basis of the preceding embodiment, the first terminal sends the first interactive image to the game server so that the game server is caused to transmit the mirror interactive image of the first interactive image to the second terminal after performing the mirror processing on the first interactive image. The second terminal forms the target interactive image of the second terminal based on the acquired second interactive image and the mirror interactive image of the first interactive image. The second interactive image in the target interactive image of the second terminal is located on the left side of the interactive region, and the mirror interactive image of the first interactive image is located on the right side of the interactive region, so as to form a complete interactive image.

The layout of the display region displayed by the first terminal or the second terminal is not limited to the layout shown in FIG. 2A or FIG. 2B. Referring to FIG. 2D, FIG. 2D is a diagram of another display region of live streaming co-hosting according to embodiment one of the present disclosure. In FIG. 2D, the display region of the first host, the display region of the second host, and the interactive region do not overlap, the interactive region may include the interactive object and/or the control object, and the interactive object and/or the control object moves in two interactive images of the interactive region. The layout of the display region of the first host, the display region of the second host, and the interactive region in FIG. 2D may be adjusted according to design requirements, which is not limited in this embodiment.

In the technical schemes of this embodiment, the first terminal combines the acquired first interactive image with the received mirror interactive image of the second interactive image of the second terminal to obtain the target interactive image suitable for the first terminal to display.

In this manner, the clarity and accuracy of the interactive images in the interactive region of different terminals are ensured in the live streaming scenario, and the confusion of the interactive images is avoided.

Embodiment Two

FIG. 3 is a flowchart of a method for controlling interactive live streaming co-hosting according to embodiment two of the present disclosure. This embodiment is described on the basis of the preceding embodiment. The method includes the steps below.

In S210, the first terminal acquires the first interactive image and receives the mirror interactive image of the second terminal. The first terminal is co-hosted with the second terminal. The second interactive image of the second terminal is mirrored to obtain the mirror interactive image of the second terminal.

In S220, the first terminal combines the first interactive image and the mirror interactive image to obtain the target interactive image.

In S230, the first terminal acquires a first video stream, receives a second video stream of the second terminal, and forms an initial video merging stream based on the first video stream and the second video stream.

In S240, the first terminal adds the target interactive image to the initial video merging stream to generate a target video merging stream. The target video merging stream is used to push to an audience terminal of the first terminal.

Each of the first terminal and the second terminal is configured with a camera. The first terminal acquires the first video stream through the first camera, and the first video stream may be a video stream including the first host. The second terminal acquires the second video stream through the second camera, and the second video stream may be a video stream including the second host. The second terminal transmits the second video stream to the first terminal, for example, the video stream may be transmitted through the realtime communication. For example, the first terminal sends the acquired first video stream to the realtime communication, the second terminal sends the acquired second video stream to the realtime communication, and the real-time communication transmits the first video stream to the second terminal and transmits the second video stream to the first terminal.

The first terminal performs stream merging processing on the first video stream and the second video stream to obtain the initial video merging stream. Based on the first video stream and the second video stream, the initial video merging stream is formed in the following manners: a stream merging position of the first video stream and a stream merging position of the second video stream are determined according to the identifier of the first video stream and the identifier of the second video stream; and the stream merging processing is performed on the first video stream and the second video stream according to the stream merging positions to form the initial video merging stream. Referring to FIG. 2A, the display region of the first host in FIG. 2A is the stream merging position of the first video stream, and the display region of the second host is the stream merging position of the second video stream. For any terminal, the stream merging position of the video stream acquired by the current terminal may be a first preset position located in the live streaming co-hosting display region of the current terminal, for example, may be a left side position. The stream merging position of the video stream acquired by a co-hosting terminal is located at a second preset position located in the live streaming co-hosting display region of the current terminal, for example, may be a right side position.

The first terminal performs the stream merging processing on the first video stream and the second video stream at corresponding stream merging positions according to the identifier of the first video stream and the identifier of the second video stream to obtain the initial video merging stream. In an embodiment, the stream merging processing may be performed on the first video stream and the second video stream according to the stream merging positions in the following manner: the stream merging processing is performed on a video frame of the first video stream and a video frame of the second video stream according to the stream merging positions based on timestamps of multiple video frames of the first video stream and timestamps of multiple video frames of the second video stream, where the video frame of the first video stream and the video frame of the second video stream have the same timestamp. The stream merging processing is performed on the first video stream and the second video stream based on the timestamps. In this manner, the live streaming delay of two video streams is avoided, and the synchronization of the video streams is improved.

The first terminal adds the target interactive image to multiple video frames corresponding to the initial video merging stream to obtain the target video merging stream of the first terminal. The target interactive image and multiple video frames in the initial video merging stream are each provided with the timestamp, and the target interactive image is added into a video frame having the same timestamp as the target interactive image.

In some embodiments, the target interactive image includes the data of the control object and/or the data of the interactive object. The control object and/or the interactive object are rendered into a corresponding video frame based on the data to complete the drawing of the target interactive image. In some embodiments, pixel values of multiple pixels in the target interactive image may be rendered in the corresponding video frame based on the position of the interactive region in the display interface, so as to complete the drawing of the target interactive image. When the interactive region overlaps with the display position of the first host and the display position of the second host, the image background of the target interactive image is transparent to avoid blocking of the image in the initial video merging stream. Accordingly, referring to FIGS. 2A and 2B, the size of the target interactive image is less than or equal to the size of each image frame in the initial video merging stream. When the interactive region does not overlap with the display position of the first host and the display position of the second host, the image background of the target interactive image may be configured according to requirements. Drawing of the target interactive image may be rendering of a display region corresponding to a video frame of the target interactive image and a display region corresponding to a video frame of the initial video merging stream respectively, where the two video frames have the same timestamp.

The target video merging stream is displayed on the first terminal, and the target video merging stream is pushed to the audience terminal corresponding to the first terminal. In this manner, it is ensured that in the live streaming images displayed on audience terminals, the host of the live streaming session is located at the same preset position for all audiences. Pushing the target video merging stream may be implemented based on a content delivery network (CDN) server.

In this embodiment, the first terminal and the second terminal are terminals having the local stream merging function. Instead of performing video stream merging by the live streaming server, the video stream merging is performed by the first terminal, so the delay of a video merging stream is reduced and the lag of a video stream is avoided.

For example, referring to FIG. 4, FIG. 4 is a diagram of a live streaming flow according to embodiment two of the present disclosure. The camera acquires the first video stream and transmits the first video stream to an effect processing module (effect sdk). The effect processing module performs beautification processing and special effect processing on the acquired first video stream, receives the second video stream, and performs the stream merging processing on the first video stream and the second video stream to obtain the initial video merging stream. The effect processing module acquires the first interactive image and receives the mirror interactive image of the second interactive image, combines the first interactive image and the mirror interactive image, and then draws the obtained target interactive image into the initial video merging stream to obtain the target video merging stream, and the target video merging stream is transmitted to a livecore. At the same time, an audio stream is acquired by a sound-pick-up device of the first terminal, or a sound effect audio stream in the first terminal is invoked. The audio stream is transmitted to the livecore, and the livecore performs the stream merging processing on the video stream and the audio stream to push the merged video stream to an audience terminal through the CDN, so as to display the video stream on the first terminal based on a surface view.

Steps S210 to S220 and step S230 may be executed sequentially or may be executed synchronously. Alternatively, step S230 may be firstly executed, and then steps S210 to S220 are executed.

In the technical schemes of this embodiment, the first terminal acquires the first interactive image and the first video stream. The second terminal acquires the second interactive image and the second video stream. The first terminal receives the second video stream and the mirror interactive image of the second interactive image, splices the first interactive image and the mirror interactive image to obtain the target interactive image, performs the stream merging processing on the first video stream and the second video stream to obtain the initial video merging stream, and draws multiple frames of target interactive images into video frames corresponding to the initial video merging stream to obtain the target video merging stream. In this manner, the combination of a host video image and an interactive image in the live streaming co-hosting scenario is implemented, the accuracy of an interactive video merging stream is improved, and confusion of a merging stream is avoided.

On the basis of the preceding embodiments, the interactive scenario of the first terminal and the second terminal may be a game scenario, and the game server performs score addition/subtraction and victory/defeat determination in the game scenario. To ensure time synchronization in the game scenario, the first terminal receives the control signaling sent by the game server and adjusts the state of the interactive scenario in which the first terminal and the second terminal are located based on the control signaling. The control signaling is sent by the game server to the first terminal and the second terminal synchronously.

The same control signaling is sent by the game server to two co-hosted terminals synchronously, so that the first terminal and the second terminal synchronously execute the preceding control signaling, thereby improving the synchronization of the game scenario. The control signaling may include start signaling, end signaling, and state switch signaling. The start signaling is used to control the game scenario to be started. The end signaling is used to control the game scenario to be ended. The state switch signaling is used to perform state switching during the process of the game scenario. The type of the state switch signaling and the number of the state switch signaling may be configured according to different game scenarios.

The preceding control signaling is configured to synchronously control the first terminal and the second terminal at the start, the end, and in the process of the game scenario. In this manner, the synchronization of the scenario is implemented, and the interaction disorder caused by a delay is reduced.

Embodiment Three

FIG. 5 is a flowchart of a method for controlling interactive live streaming co-hosting according to embodiment three of the present disclosure. This embodiment of the present disclosure is applied to the case where a live streaming interactive image is formed in the application scenario of interactive live streaming co-hosting. This method may be executed by the apparatus for controlling interactive live streaming co-hosting. The apparatus may be implemented in the form of software and/or hardware. The apparatus may be implemented by the electronic device, and the electronic device may be a server.

In S310, the game server receives the second interactive image sent by the second terminal and mirrors the second interactive image to obtain the mirror interactive image.

In S320, the game server transmits the mirror interactive image to the first terminal based on a realtime communication to enable the first terminal to form the target interactive image based on the acquired first interactive image and the mirror interactive image.

In this embodiment, for the first terminal, the game server mirrors the second interactive image sent by the second terminal to obtain the mirror interactive image and transmits the mirror interactive image to the first terminal, so that the first terminal is caused to form the target interactive image based on the first interactive image and the mirror interactive image. In this manner, there is no need to process the first interactive image in the preceding process, the correctness of the target interactive image is ensured, and the calculation amount of the game server is reduced at the same time.

Similarly, for the second terminal, the game server mirrors the first interactive image sent by the first terminal to obtain the mirror interactive image and transmits the mirror interactive image to the second terminal, so that the second terminal is caused to form the target interactive image based on the acquired second interactive image and the mirror interactive image, and there is no need to process the second interactive image in the preceding process.

In an embodiment, the second interactive image may be mirrored in the following manner: the second interactive image is mirrored by using the common edge of the second interactive image and the first interactive image as a mirror edge. For example, an edge in the second interactive image consistent with the center line of the interactive region may be used as the mirror edge. Thus, it is ensured that the mirror interactive image obtained after the mirror processing is correctly connected with the first interactive image, avoiding the confusion of the target interactive image. The second interactive image may be mirrored based on the mirror edge, multiple pixels in the second interactive image are correspondingly disposed at corresponding positions on the other side of the mirror edge. Exemplarily, when the mirror edge is a longitudinal edge, the ordinates of the pixels are kept unchanged, and the difference value between the abscissa of the current pixel and the abscissa of the mirror edge is the same as the difference value between the abscissa of the mirror pixel and the abscissa of the mirror edge. Similarly, when the mirror edge is a lateral edge, the abscissas of the pixels are kept unchanged, and the difference value between the ordinate of the current pixel and the ordinate of the mirror edge is the same as the difference value between the ordinate of the mirror pixel and the ordinate of the mirror edge.

In the technical schemes of this embodiment, after the game server mirrors an interactive image acquired by one of the two co-hosted terminals, the interactive image obtained after the mirror processing is transmitted to the other terminal so that the other terminal combines the interactive images to obtain a target interactive image satisfying the display requirement of the other terminal. For any terminal, a target interactive image satisfying display requirements of multiple terminals may be obtained based on the preceding method. Moreover, the interaction requirement and the display requirement of live streaming co-hosting are both considered, and the accuracy of the target interactive image displayed by the multiple terminals is ensured.

In an embodiment, the game server may send the control signaling to the first terminal and the second terminal synchronously to enable the first terminal and the second terminal to synchronously execute the control signaling. The control signaling includes start signaling, end signaling, and state switch signaling. The preceding control signaling is configured to synchronously control the first terminal and the second terminal at the start, the end, and in the process of the game scenario. In this manner, the synchronization of the scenario is implemented, and the interaction disorder caused by a delay is reduced.

Embodiment Four

In this embodiment, the game interactive scenario is used as an example to describe the image forming method of the interactive region in the method for controlling interactive live streaming co-hosting provided in the preceding embodiments. As shown in FIG. 2C, the control object of the current host and the control object of a co-hosting host are each a baffle, and the interactive object is a ball. The current host may control the baffle corresponding to the current host to move up and down in the display region so that after hitting the baffle corresponding to the current host, the ball bounces back to the display region in which the baffle corresponding to the co-hosting host is located. FIG. 2C merely exemplarily shows that the ball moves horizontally from the display region in which the baffle corresponding to the current host is located to the display region in which the baffle corresponding to the co-hosting host is located. The ball may move in any direction in the game interactive scenario, as long as the bounce law after the ball hits the baffle is conformed.

In this embodiment, the current host controls the up and down movement of the baffle by changing the position of the face, that is, the current host nods down, which represents that the baffle is controlled to move down, while the current host looks up, which represents that the baffle is controlled to move upward. The terminal of the current host identifies the control information in the video image of the current host, and the control information is the ordinate of the face of the current host. The position data of the baffle corresponding to the current host in the display region in the game interactive scenario is determined frame by frame based on the control information. The interactive image for the current host is formed based on the rendering of the position data of the baffle and the position data of the ball. In the interactive image of the current host, the baffle corresponding to the current host is always located on the left side of the interactive image of the current host. Similarly, on the terminal side of the co-hosting host, the interactive image of the co-hosting host is formed by rendering in the same manner as described above. In the interactive image of the co-hosting host, the baffle corresponding to the co-hosting host is always located on the left side of the interactive image of the co-hosting host.

The terminal of the current host combines the interactive image acquired by the terminal of the current host and the mirror image of the interactive image of the co-hosting host to form the image of the interactive region displayed on the terminal of the current host. In this manner, in the image of the interactive region, the baffle corresponding to the current host and the baffle corresponding to the co-hosting host are located on two sides of the image of the interactive region, and the baffle corresponding to the current host is located on the left side of the image of the interactive region, as shown in FIG. 2C. Similarly, an image composed of the interactive image of the co-hosting host and the mirror image of the interactive image of the current host is formed in the interactive region on the terminal side of the co-hosting host. The baffle corresponding to the co-hosting host is located on the left side of the image of the interactive region.

Through the preceding methods, the image in the interactive region is continuously rendered on the terminal of the host, and the image in the interactive region is pushed to the audience terminal in the live streaming session of the host so that the image in the interactive region displayed in the audience terminal is consistent with the image in the interactive region on the terminal of the host.

Embodiment Five

FIG. 6 is a diagram illustrating the structure of an apparatus for controlling interactive live streaming co-hosting according to embodiment five of the present disclosure. The apparatus for controlling interactive live streaming co-hosting is integrated in a terminal, such as a mobile terminal or a PC terminal. As shown in FIG. 6, the apparatus includes an interactive image acquisition module 410 and a target interactive image determination module 420.

The interactive image acquisition module 410 is configured to acquire a first interactive image and receive a mirror interactive image of a second terminal. The first terminal is co-hosted with the second terminal. A second interactive image of the second terminal is mirrored to obtain the mirror interactive image of the second terminal. The target interactive image determination module 420 is configured to combine the first interactive image and the mirror interactive image to obtain a target interactive image.

In the technical schemes provided by this embodiment of the present disclosure, the interactive image acquisition module acquires the first interactive image and the mirror interactive image respectively. The acquired first interactive image and the received mirror interactive image of the second interactive image of the second terminal are combined based on the target interactive image determination module to obtain the target interactive image suitable for the first terminal to display. In this manner, the clarity and accuracy of the interactive images in the interactive region of different terminals in the live streaming scenario are ensured, and the confusion of interactive images is avoided.

On the basis of the preceding technical schemes, the first interactive image and/or the second interactive image includes at least one interactive object. The interactive object moves in the first interactive image and the second interactive image.

On the basis of the preceding technical schemes, the interactive image acquisition module 410 is configured to acquire the first interactive image in the following manner: control information in a video image of a first user is identified, and data, in the interactive region of the first terminal, of the control object in the interactive scenario is determined frame by frame based on the control information; and the first interactive image corresponding to the interactive region of the first terminal is formed based on the data.

On the basis of the preceding technical schemes, the control object is different from the interactive object, or the control object is one or more of the at least one interactive object.

On the basis of the preceding technical schemes, the apparatus also includes a video stream acquisition module, an initial video merging stream generation module, and a target video merging stream generation module. The video stream acquisition module is configured to acquire the first video stream and receive the second video stream of the second terminal. The initial video merging stream generation module is configured to form the initial video merging stream based on the first video stream and the second video stream. The target video merging stream generation module is configured to add the target interactive image into the initial video merging stream to generate the target video merging stream. The target video merging stream is used to push to an audience terminal of the first terminal.

On the basis of the preceding technical schemes, the initial video merging stream generation module includes a stream merging position unit and a stream merging unit. The stream merging position unit is configured to determine a stream merging position of the first video stream and a stream merging position of the second video stream according to an identifier of the first video stream and an identifier of the second video stream. The stream merging unit is configured to perform stream merging processing on the first video stream and the second video stream according to the stream merging positions to form the initial video merging stream.

On the basis of the preceding technical schemes, the stream merging unit is also configured to perform the stream merging processing on the video frame of the first video stream and the video frame of the second video stream according to the stream merging positions based on timestamps of multiple video frames of the first video stream and timestamps of multiple video frames of the second video stream, where the video frame of the first video stream and the video frame of the second video stream have the same timestamp.

On the basis of the preceding technical schemes, the apparatus also includes a signaling reception execution module. The signaling reception execution module is configured to receive control signaling sent by a game server and adjust a state of the interactive scenario in which the first terminal and the second terminal are located based on the control signaling. The control signaling is sent by the game server synchronously to the first terminal and the second terminal.

On the basis of the preceding technical schemes, the control signaling includes start signaling, end signaling, and state switch signaling.

The apparatus provided by this embodiment of the present disclosure may execute the method provided by any embodiment of the present disclosure and has functional modules and beneficial effects corresponding to the method executed.

The multiple units and modules included in the preceding apparatus are just divided according to functional logic but are not limited to such division, as long as the corresponding functions can be implemented. Additionally, the name of each functional unit is just for distinguishing between each other but not to limit the protection scope of the embodiments of the present disclosure.

Embodiment Six

Figure 7:
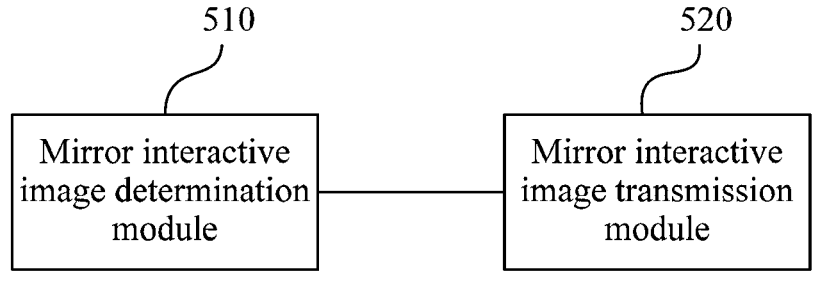
FIG. 7 is a diagram illustrating the structure of an appa-
ratus for controlling interactive live streaming co-hosting
according to embodiment six of the present disclosure.

FIG. 7 is a diagram illustrating the structure of an apparatus for controlling interactive live streaming co-hosting according to embodiment six of the present disclosure. The apparatus may be integrated in a server. As shown in FIG. 7, the apparatus includes a mirror interactive image determination module 510 and a mirror interactive image transmission module 520.

The mirror interactive image determination module 510 is configured to receive a second interactive image sent by a second terminal and mirror the second interactive image to obtain a mirror interactive image. The mirror interactive image transmission module 520 is configured to transmit the mirror interactive image to a first terminal based on realtime communication to enable the first terminal to form a target interactive image based on an acquired first interactive image and the mirror interactive image.

In the technical schemes provided by this embodiment of the present disclosure, after the mirror interactive image determination module in the game server mirrors the interactive image acquired by one of the two co-hosted terminals, the interactive image obtained after the mirror processing is transmitted to the other terminal based on the mirror interactive image transmission module, so that the other terminal combines interactive images to obtain the target interactive image satisfying the display requirement of the other terminal. For any terminal, the target interactive image satisfying the display requirements of multiple terminals may be obtained based on the preceding method. Moreover, the interaction requirement and the display requirement of live streaming co-hosting are both considered, and the accuracy of the target interactive image displayed by the multiple terminals is ensured.

On the basis of the preceding technical schemes, the mirror interactive image determination module 510 is configured to mirror the second interactive image in the following manner: the second interactive image is mirrored by using a common edge of the second interactive image and the first interactive image as a mirror edge.

On the basis of the preceding technical schemes, the apparatus also includes a control signaling sending module. The control signaling sending module is configured to send the control signaling synchronously to the first terminal and the second terminal to enable the first terminal and the second terminal to synchronously execute the control signaling.

On the basis of the preceding technical schemes, the control signaling includes start signaling, end signaling, and state switch signaling.

The apparatus provided by this embodiment of the present disclosure may execute the method provided by any embodiment of the present disclosure and has functional modules and beneficial effects corresponding to the method executed.

The multiple units and modules included in the preceding apparatus are just divided according to functional logic but are not limited to such division, as long as the corresponding functions can be implemented. Additionally, the name of each functional unit is just for distinguishing between each other but not to limit the protection scope of the embodiments of the present disclosure.

Embodiment Seven

Figure 8:
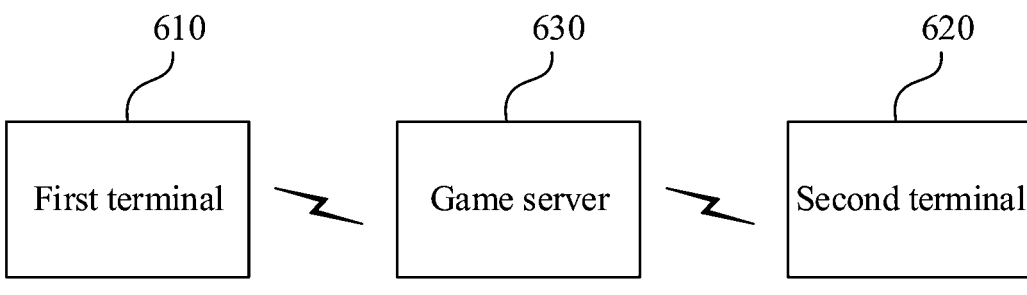
FIG. 8 is a diagram illustrating the structure of a system
for controlling interactive live streaming co-hosting accord-
ing to embodiment seven of the present disclosure.

FIG. 8 is a diagram illustrating the structure of a system for controlling interactive live streaming co-hosting according to embodiment seven of the present disclosure. The system includes a first terminal 610, a second terminal 620, and a game server 630.

The first terminal 610 acquires a first interactive image and sends the first interactive image to the game server 630. The second terminal 620 acquires a second interactive image and sends the second interactive image to the game server 630. The game server 630 mirrors the first interactive image and the second interactive image separately to obtain a first mirror interactive image and a second mirror interactive image, transmits the first mirror interactive image to the second terminal 620, and transmits the second mirror interactive image to the first terminal 610. The first terminal 610 generates a first target interactive image based on the first interactive image and the second mirror interactive image. The second terminal 620 generates a second target interactive image based on the second interactive image and the first mirror interactive image.

In the technical schemes of this embodiment, after the game server mirrors the interactive image acquired by the first terminal and the interactive image acquired by the second terminal respectively, where the first terminal is co-hosted with the second terminal, the interactive image obtained after the mirror processing is transmitted to the other terminal, so that the other terminal combines interactive images to obtain the target interactive image satisfying the display requirement of the other terminal. The display requirement of the first terminal and the display requirement of the second terminal can be simultaneously satisfied, and the accuracy of the target interactive image displayed by multiple terminals is ensured.

Figure 9:
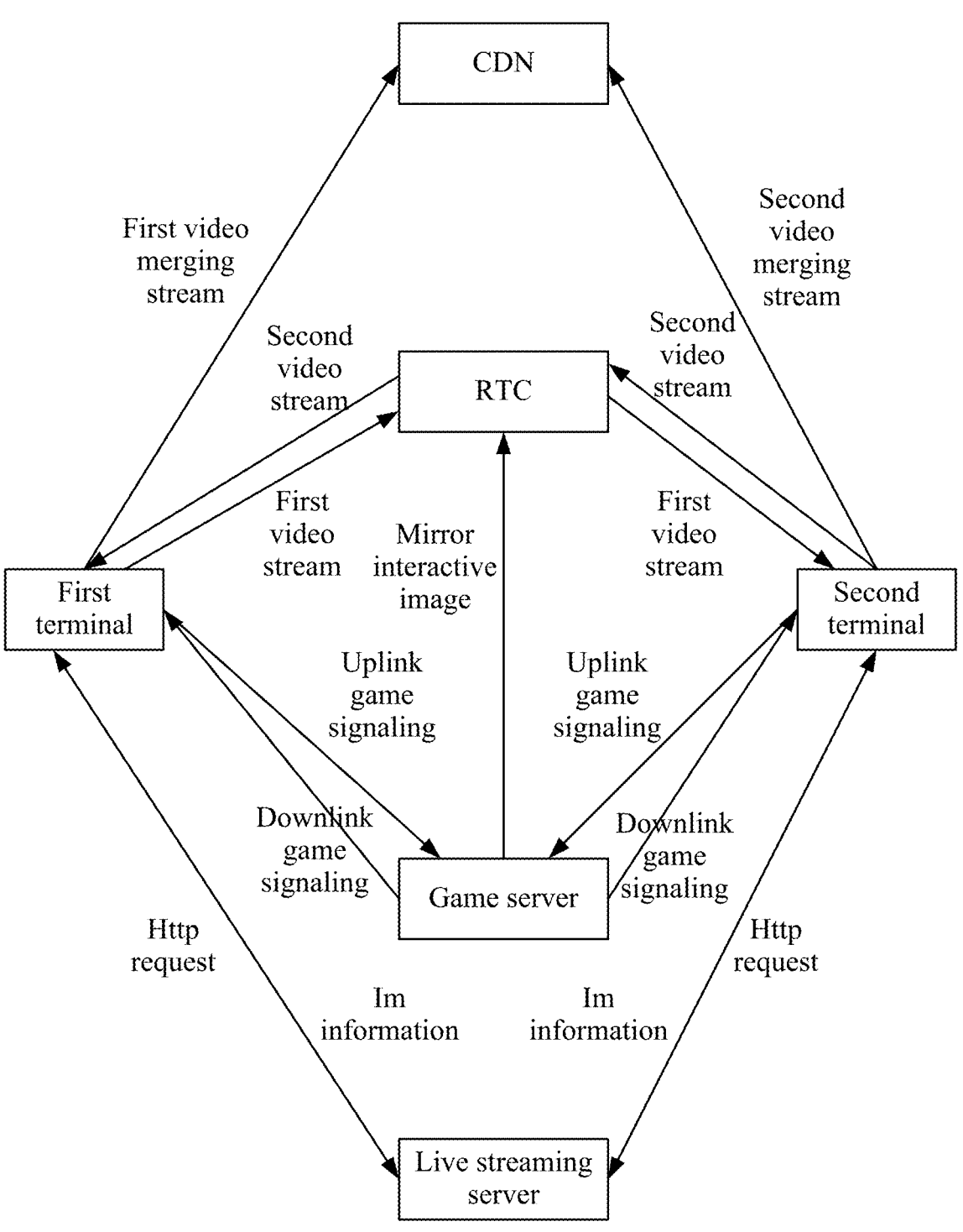
FIG. 9 is a diagram illustrating the structure of another
system for controlling interactive live streaming co-hosting
according to embodiment seven of the present disclosure.

On the basis of the preceding embodiments, the system also includes a realtime communication. The realtime communication is communicatively connected to the first terminal, the second terminal, and the game server. For example, referring to FIG. 9, FIG. 9 is a diagram illustrating the structure of another system for controlling interactive live streaming co-hosting according to embodiment seven of the present disclosure.

The realtime communication is configured to receive the first mirror interactive image and the second mirror interactive image transmitted by the game server, transmit the first mirror interactive image to the second terminal, and transmit the second mirror interactive image to the first terminal.

On the basis of the preceding embodiments, the first terminal acquires a first video stream and transmits the first video stream to the second terminal based on the realtime communication. The second terminal acquires a second video stream and transmits the second video stream to the first terminal based on the realtime communication. An identifier of a target terminal may be respectively provided in the first video stream and the second video stream. The realtime communication may determine a transmission target according to the identifier of the target terminal. The realtime communication transmits the mirror interactive image. In this manner, the transmission speed is high, and the transmission efficiency and synchronization are effectively improved.

The first terminal forms a first video merging stream based on the first video stream, the second video stream, and the first target interactive image. The second terminal forms a second video merging stream based on the first video stream, the second video stream, and the second target interactive image.

The system also includes a content delivery network server communicatively connected to the first terminal and the second terminal. The content delivery network server is configured to receive the first video merging stream transmitted by the first terminal and the second video merging stream transmitted by the second terminal and push the first video merging stream to a corresponding audience terminal and the second video merging stream to a corresponding audience terminal. The first video merging stream and the second video merging stream may be provided with corresponding identifiers, for example, terminal identifiers (IDs). The content delivery network server determines the corresponding audience terminal for pushing according to the identifier in the video merging stream to ensure a correct pushing.

The system also includes a live streaming server communicatively connected to the first terminal and the second terminal. The live streaming server is configured to receive a co-hosting request of the first terminal or a co-hosting request of the second terminal and perform co-hosting matching on the first terminal and the second terminal based on the co-hosting request. The co-hosting request in FIG. 9 may be configured as a hyper text transfer protocol (HTTP) request. The live streaming server is only configured to perform live broadcast co-hosting matching and transmission of live streaming related information, and the live streaming server does not need to perform video stream merging processing. In this manner, the workload of the live streaming server is reduced, and the delay and lag of the live streaming server are avoided. The game server and the live streaming server are independent of each other and do not interwork.

The game server sends the control signaling synchronously to the first terminal and the second terminal to enable the first terminal and the second terminal to synchronously execute the control signaling. In FIG. 9, the control signaling is configured as downlink game signaling. The downlink game signaling may be, but is not limited to, game start signaling, session preparation signaling, display toast signaling, single game ready signaling, single game end signaling, game end signaling, game data signaling, prop scramble start signaling, prop entry/end signaling, a notification information signaling, and so on. Uplink game signaling may be game data signaling transmitted by the first terminal and the second terminal to the game server.

Embodiment Eight

Figure 10:
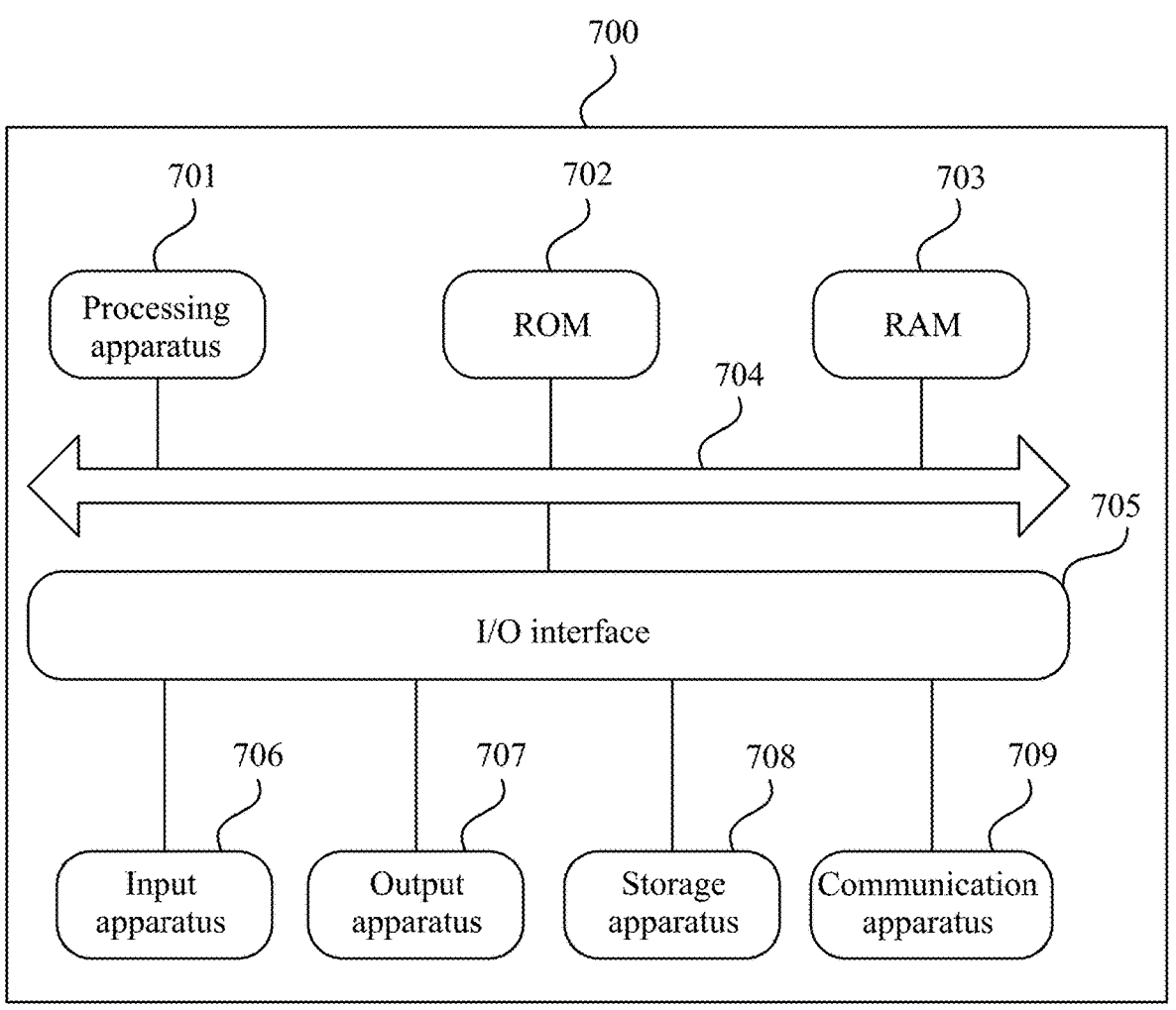
FIG. 10 is a diagram illustrating the structure of an
electronic device according to embodiment eight of the
present disclosure.

Referring to FIG. 10, FIG. 10 shows a diagram illustrating the structure of an electronic device 700 (such as the terminal device or server in FIG. 10) applicable to implementing the embodiments of the present disclosure. The terminal device in the embodiments of the present disclosure may include, but is not limited to, mobile terminals such as a mobile phone, a laptop, a digital broadcast receiver, a personal data assistant (PDA), a portable Android device (PAD), a portable media player (PMP) and an in-vehicle terminal (such as an in-vehicle navigation terminal), and stationary terminals such as a digital television (TV) and a desktop computer. The electronic device shown in FIG. 10 is merely an example and is not intended to limit the function and usage scope of the embodiments of the present disclosure.

As shown in FIG. 10, the electronic device 700 may include a processing apparatus (such as a central processing unit and a graphics processing unit) 701. The processing apparatus 701 may execute multiple appropriate actions and processing according to a program stored in a read-only memory (ROM) 702 or a program loaded into a random-access memory (RAM) 703 from a storage apparatus 708. The RAM 703 also stores various programs and data required for the operation of the electronic device 700. The processing apparatus 701, the ROM 702, and the RAM 703 are connected to each other through a bus 704. An input/output (I/O) interface 705 is also connected to the bus 704.

Generally, the following apparatuses may be connected to the I/O interface 705: an input apparatus 706 such as a touch screen, a touch pad, a keyboard, a mouse, a camera, a microphone, an accelerometer and a gyroscope; an output apparatus 707 such as a liquid crystal display (LCD), a speaker and a vibrator; the storage apparatus 708 such as a magnetic tape and a hard disk; and a communication apparatus 709. The communication apparatus 709 may allow the electronic device 700 to perform wireless or wired communication with other devices to exchange data. Although FIG. 10 shows the electronic device 700 having various apparatuses, not all the apparatuses shown here need to be implemented or present. Alternatively, more or fewer apparatuses may be implemented or present.

According to embodiments of the present disclosure, the process described above with reference to the flowchart may be implemented as a computer software program. For example, the embodiments of the present disclosure include a computer program product. The computer program product includes a computer program carried in a non-transitory computer-readable medium. The computer program includes program codes for executing the method shown in the flowchart. In such an embodiment, the computer program may be downloaded from a network and installed through the communication apparatus 709, or may be installed from the storage apparatus 708, or may be installed from the ROM 702. When the computer program is executed by the processing apparatus 701, the preceding functions defined in the method of the embodiments of the present disclosure are executed.

The electronic device provided in the embodiment of the present disclosure belongs to the same inventive concept as the method for controlling interactive live streaming co-hosting provided in the preceding embodiments. For the technical details not described in detail in the embodiment, reference may be made to the preceding embodiments, and the embodiment has the same beneficial effects as the preceding embodiments.

Embodiment Nine

An embodiment of the present disclosure provides a computer storage medium storing a computer program. When executing the computer program, a processor performs the method for controlling interactive live streaming co-hosting provided in the preceding embodiments.

The computer-readable medium described above in the present disclosure may be a computer-readable signal medium or a computer-readable storage medium or any combination thereof. The computer-readable storage medium, for example, may be, but is not limited to, an electronic, magnetic, optical, electromagnetic, infrared or semiconductor system, apparatus or device, or any combination thereof. An example of the computer-readable storage medium may include, but is not limited to, an electrical connection having one or more wires, a portable computer magnetic disk, a hard disk, a RAM, a ROM, an erasable programmable read-only memory (EPROM), a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included in the computer-readable medium may be transmitted in any suitable medium, including, but not limited to, a wire, an optical cable, a radio frequency (RF), or any suitable combination thereof.

In some embodiments, clients and servers may communicate using any currently known or future developed network protocol, such as an HTTP, and may be interconnected with any form or medium of digital data communication (such as a communication network). Examples of the communication network include a local area network (LAN), a wide area networks (WAN), an internet (for example, the Internet), a peer-to-peer network (for example, an Ad-Hoc network), and any network currently known or to be developed in the future.

The preceding computer-readable medium may be included in the preceding electronic device or may exist alone without being assembled into the electronic device.

The preceding computer-readable medium carries one or more programs. When the one or more programs are executed by the electronic device, the electronic device executes the steps below.

The first terminal acquires the first interactive image and receives the mirror interactive image of the second terminal. The first terminal is co-hosted with the second terminal. The second interactive image of the second terminal is mirrored to obtain the mirror interactive image of the second terminal. The first terminal combines the first interactive image and the mirror interactive image to obtain the target interactive image.

Computer program codes for performing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case involving the remote computer, the remote computer may be connected to the user computer through any type of network including a LAN or a WAN, or may be connected to an external computer (for example, via the Internet through an Internet service provider).

The flowcharts and block diagrams in the drawings show possible architectures, functions and operations of the system, method and computer program product according to multiple embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The units involved in the embodiments of the present disclosure may be implemented by software or hardware. The names of the units/modules do not constitute a limitation on the units themselves in one case. For example, an interactive image acquisition behavior data acquisition module may also be described as an "acquisition module".

The functions described above herein may be executed, at least partially, by one or more hardware logic components. For example, without limitation, exemplary types of hardware logic components that may be used include: a field programmable gate array (FPGA), an application specific integrated circuit (ASIC), application specific standard parts (ASSP), a system-on-a-chip (SoC), a complex programmable logic device (CPLD) and the like.

In the context of the present disclosure, the machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Examples of the machine-readable storage medium may include an electrical connection based on one or more wires, a portable computer disk, a hard disk, a RAM, a ROM, an EPROM or a flash memory, an optical fiber, a CD-ROM, an optical storage device, a magnetic storage device, or any suitable combination thereof.

According to one or more embodiments of the present disclosure, [example one] provides a method for controlling interactive live streaming co-hosting. The method includes the steps below.

The first terminal acquires the first interactive image and receives the mirror interactive image of the second terminal. The first terminal and the second terminal are in the live streaming co-hosting state. The second interactive image of the second terminal is mirrored to obtain the mirror interactive image of the second terminal. The first terminal combines the first interactive image and the mirror interactive image to obtain the target interactive image.

According to one or more embodiments of the present disclosure, [example two] provides a method for controlling interactive live streaming co-hosting. The method also includes the steps below.

In an embodiment, the first interactive image and/or the second interactive image may include at least one interactive object. The interactive object moves in the first interactive image and the second interactive image.

According to one or more embodiments of the present disclosure, [example three] provides a method for controlling interactive live streaming co-hosting. The method also includes the steps below.

In an embodiment, the first terminal acquires the first interactive image in the following manners: the first terminal identifies the control information in the video image of the first user, and the data, in the interactive region of the first terminal, of the control object in the interactive scenario is determined frame by frame based on the control information; and the first interactive image corresponding to the interactive region of the first terminal is formed based on the data.

According to one or more embodiments of the present disclosure, [example four] provides a method for controlling interactive live streaming co-hosting. The method also includes the steps below.

In an embodiment, the control object is different from the interactive object, or the control object is one or more of the at least one interactive object.

According to one or more embodiments of the present disclosure, [example five] provides a method for controlling interactive live streaming co-hosting. The method also includes the steps below.

In an embodiment, the method also includes the steps below.

The first terminal acquires the first video stream, receives the second video stream of the second terminal, and forms the initial video merging stream based on the first video stream and the second video stream. The first terminal adds the target interactive image to the initial video merging stream to generate the target video merging stream. The target video merging stream is used to push to the audience terminal of the first terminal.

According to one or more embodiments of the present disclosure, [example six] provides a method for controlling interactive live streaming co-hosting. The method also includes the steps below.

In an embodiment, the initial video merging stream is formed in the manners below based on the first video stream and the second video stream.

The stream merging position of the first video stream and the stream merging position of the second video stream are determined according to the identifier of the first video stream and the identifier of the second video stream. Stream merging processing is performed on the first video stream and the second video stream according to the stream merging positions to form the initial video merging stream.

According to one or more embodiments of the present disclosure, [example seven] provides a method for controlling interactive live streaming co-hosting. The method also includes the steps below.

In an embodiment, stream merging processing is performed on the first video stream and the second video stream in the manner below according to the stream merging positions.

Stream merging processing is performed on the video frame of the first video stream and the video frame of the second video stream according to the stream merging positions based on the timestamps of multiple video frames of the first video stream and the timestamps of multiple video frames of the second video stream, where the video frame of the first video stream and the video frame of the second video stream have the same timestamp.

According to one or more embodiments of the present disclosure, [example eight] provides a method for controlling interactive live streaming co-hosting. The method also includes the steps below.

In an embodiment, the image background of the target interactive image is a transparent background.

According to one or more embodiments of the present disclosure, [example nine] provides a method for controlling interactive live streaming co-hosting. The method also includes the steps below.

In an embodiment, the size of the target interactive image is less than or equal to the size of each image frame in the initial video merging stream.

According to one or more embodiments of the present disclosure, [example ten] provides a method for controlling interactive live streaming co-hosting. The method also includes the steps below.

In an embodiment, the method also includes the steps below.

The first terminal receives the control signaling sent by the game server and adjusts the state of the interactive scenario in which the first terminal and the second terminal are located based on the control signaling. The control signaling is synchronously sent by the game server to the first terminal and the second terminal.

According to one or more embodiments of the present disclosure, [example eleven] provides a method for controlling interactive live streaming co-hosting. The method also includes the steps below.

In an embodiment, the control signaling includes start signaling, end signaling, and state switch signaling.

According to one or more embodiments of the present disclosure, [example twelve] provides a method for controlling interactive live streaming co-hosting. The method includes the steps below.

The game server receives the second interactive image sent by the second terminal and mirrors the second interactive image to obtain the mirror interactive image. The game server transmits the mirror interactive image to the first terminal based on the realtime communication to enable the first terminal to form the target interactive image based on the acquired first interactive image and the mirror interactive image.

According to one or more embodiments of the present disclosure, [example thirteen] provides a method for controlling interactive live streaming co-hosting. The method also includes the steps below.

In an embodiment, the second interactive image is mirrored in the manner below.

The second interactive image is mirrored by using the common edge of the second interactive image and the first interactive image as the mirror edge.

According to one or more embodiments of the present disclosure, [example fourteen] provides a method for controlling interactive live streaming co-hosting. The method also includes the steps below.

In an embodiment, the game server sends the control signaling synchronously to the first terminal and the second terminal to enable the first terminal and the second terminal to synchronously execute the control signaling.

The preceding description is merely illustrative of the embodiments of the present disclosure and the technical principles used therein. The scope referred to in the disclosure is not limited to the technical schemes formed by the particular combination of the preceding technical features, but is intended to cover other technical schemes which may be formed by any combination of the preceding technical features or their equivalents without departing from the preceding concept. For example, technical schemes formed by mutual substitutions of the preceding feature and the technical features disclosed in the present disclosure (but not limited to) that have similar functions.

In addition, although multiple operations are depicted in a particular order, this should not be construed as requiring that such operations should be performed in the particular order shown or in a sequential order. In certain circumstances, multitasking and parallel processing may be advantageous. Similarly, although implementation details are included in the preceding discussion, these should not be construed as limiting the scope of the present disclosure.

Some features described in the context of separate embodiments may also be implemented in combination in a single embodiment. Conversely, various features described in the context of a single embodiment may also be implemented in multiple embodiments, individually or in any suitable subcombination.

What is claimed is:

1. A method for controlling live streaming interaction comprises:

acquiring a first interactive image of a first terminal;

receiving a mirror interactive image of a second terminal, wherein the first terminal and the second terminal are in a live streaming interaction state in a live streaming, the first interactive image is an image of an interactive object in a first interactive region of the first terminal, the mirror interactive image of the second terminal is obtained by performing mirror processing on a second interactive image of the second terminal, and the second interactive image is an image of the interactive object in a second interactive region of the second terminal;

combining, by the first terminal, the first interactive image and the mirror interactive image to obtain a target interactive image for the live streamlining, wherein at least one interactive object moves between the first interactive region corresponding to the first interactive image and the second interactive region corresponding to the second interactive image; and receiving, by the first terminal, control signaling sent by a game server and adjusting a state of an interactive scenario in which the first terminal and the second terminal are located based on the control signaling, wherein the control signaling is sent by the game server synchronously to the first terminal and the second terminal, wherein the control signaling comprises start signaling, end signaling, and state switch signaling.

2. The method according to claim 1, wherein the movement of the at least one interactive object between the first interactive region and the second interactive region is determined according to a movement pattern, the movement pattern being determined based on an interactive scenario in which the first terminal and the second terminal are located.

3. The method according to claim 1, wherein a visual style of the at least one interactive object during the movement is determined based on an interactive scenario in which the first terminal and the second terminal are located.

4. The method according to claim 1, wherein at least one of a location, a speed, a direction, or a shape of the at least one interactive object is controlled during the movement of the at least one interactive object between the first interactive region and the second interactive region.

5. The method according to claim 1, wherein acquiring the first interactive image comprises:

identifying, by the first terminal, control information in a video image of a first user;

determining, in an interactive scenario, data of a control object in the first interactive region of the first terminal based on the control information; and forming the first interactive image corresponding to the first interactive region of the first terminal based on the data of the control object.

6. The method according to claim 5, wherein the control object is different from the at least one interactive object, or the control object is at least one of the at least one interactive object.

7. The method according to claim 1, wherein forming the initial video merging stream based on the first video stream and the second video stream comprises:

determining, according to an identifier of the first video stream and an identifier of the second video stream, a stream merging position of the first video stream and a stream merging position of the second video stream; and performing, according to the stream merging position of the first video stream and the stream merging position of the second video stream, stream merging processing on the first video stream and the second video stream to form the initial video merging stream.

8. The method according to claim 7, wherein performing, according to the stream merging position of the first video stream and the stream merging position of the second video stream, the stream merging processing on the first video stream and the second video stream comprises:

performing, based on timestamps of a plurality of video frames of the first video stream and timestamps of a plurality of video frames of the second video stream, the stream merging processing on a video frame in the first video stream and a video frame in the second video stream according to the stream merging position of the first video stream and the stream merging position of the second video stream, wherein the video frame in the first video and the video frame in the second video have a same timestamp.

9. An electronic device, comprising:

at least one processor; and a storage apparatus, configured to store at least one program;

wherein the at least one processor, when executing the at least one program, perform acts comprising:

acquiring a first interactive image of a first terminal;

receiving a mirror interactive image of a second terminal, wherein the first terminal and the second terminal are in a live streaming interaction state in a live streaming, the first interactive image is an image of an interactive object in a first interactive region of the first terminal, the mirror interactive image of the second terminal is obtained by performing mirror processing on a second interactive image of the second terminal, and the second interactive image is an image of the interactive object in a second interactive region of the second terminal;

combining, by the first terminal, the first interactive image and the mirror interactive image to obtain a target interactive image for the live streamlining, wherein at least one interactive object moves between the first interactive region corresponding to the first interactive image and the second interactive region corresponding to the second interactive image; and receiving, by the first terminal, control signaling sent by a game server and adjusting a state of an interactive scenario in which the first terminal and the second terminal are located based on the control signaling, wherein the control signaling is sent by the game server synchronously to the first terminal and the second terminal, wherein the control signaling comprises start signaling, end signaling, and state switch signaling.

10. The electronic device according to claim 9, wherein the movement of the at least one interactive object between the first interactive region and the second interactive region is determined according to a movement pattern, the movement pattern being determined based on an interactive scenario in which the first terminal and the second terminal are located.

11. The electronic device according to claim 9, wherein a visual style of the at least one interactive object during the movement is determined based on an interactive scenario in which the first terminal and the second terminal are located.

12. The electronic device according to claim 9, wherein at least one of a location, a speed, a direction, or a shape of the at least one interactive object is controlled during the movement of the at least one interactive object between the first interactive region and the second interactive region.

13. The electronic device according to claim 9, wherein acquiring the first interactive image comprises:

identifying, by the first terminal, control information in a video image of a first user;

determining, in an interactive scenario, data of a control object in the first interactive region of the first terminal based on the control information; and forming the first interactive image corresponding to the first interactive region of the first terminal based on the data.

\*  \*  \*  \*  \*